April 1, 1958  K. W. PFLEGER  2,829,342
TIME MEASURING SYSTEM
Original Filed April 25, 1951  8 Sheets-Sheet 1
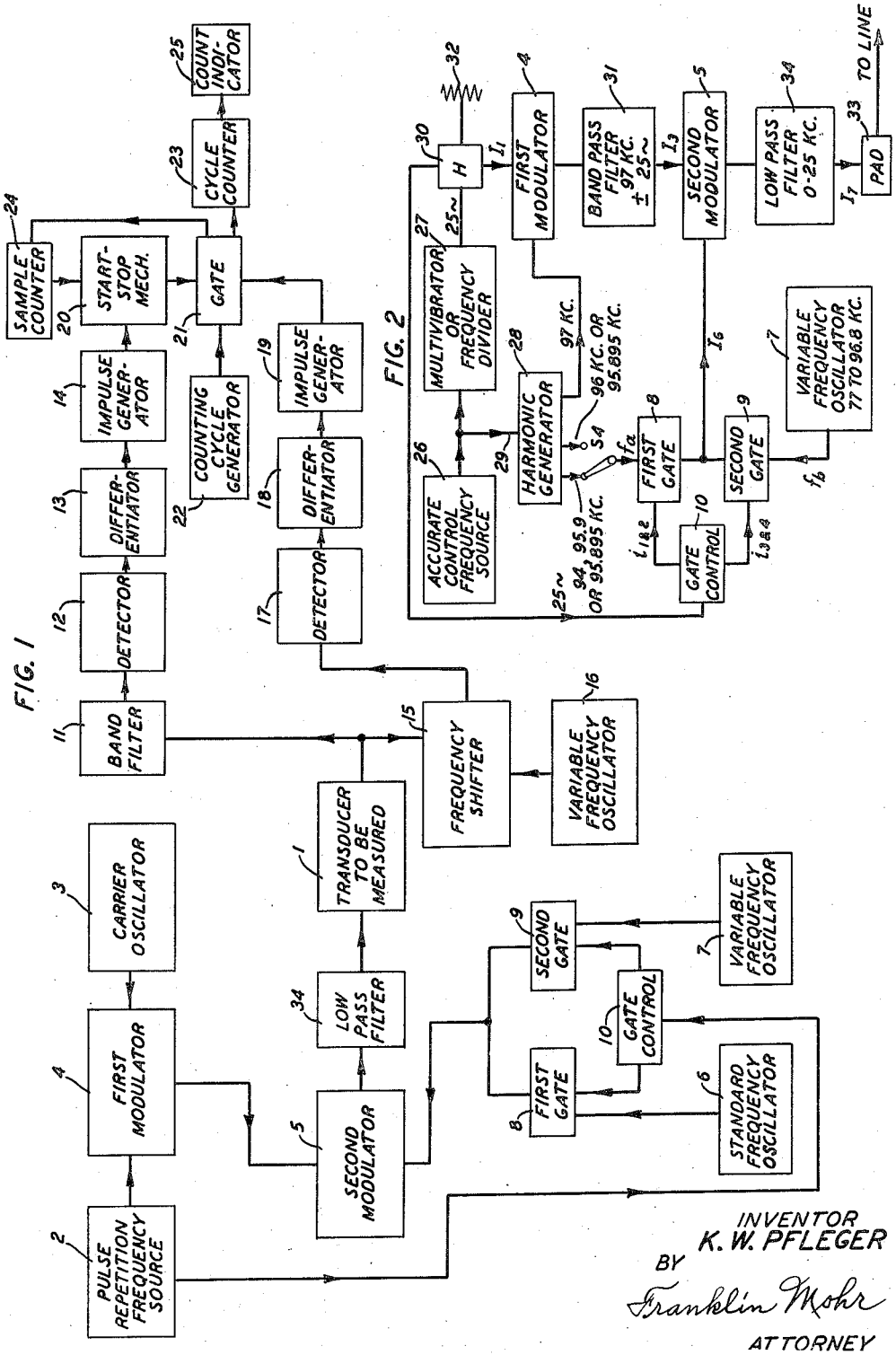
INVENTOR
K. W. PFLEGER
BY
Franklin Mohr
ATTORNEY April 1, 1958 K. W. PFLEGER 2,829,342
TIME MEASURING SYSTEM
Original Filed April 25, 1951 8 Sheets-Sheet 5

INVENTOR
K. W. PFLEGER
BY
Franklin Mohr
ATTORNEY

April 1, 1958  K. W. PFLEGER  2,829,342
TIME MEASURING SYSTEM

Original Filed April 25, 1951  8 Sheets-Sheet 6

OSCILLOGRAMS (NEGLECTING DELAY IN FILTERS)
TIME

ENLARGED OSCILLOGRAMS
TIME

INVENTOR
K. W. PFLEGER
BY
Franklin Mohr
ATTORNEY

April 1, 1958     K. W. PFLEGER     2,829,342
TIME MEASURING SYSTEM
Original Filed April 25, 1951     8 Sheets-Sheet 7
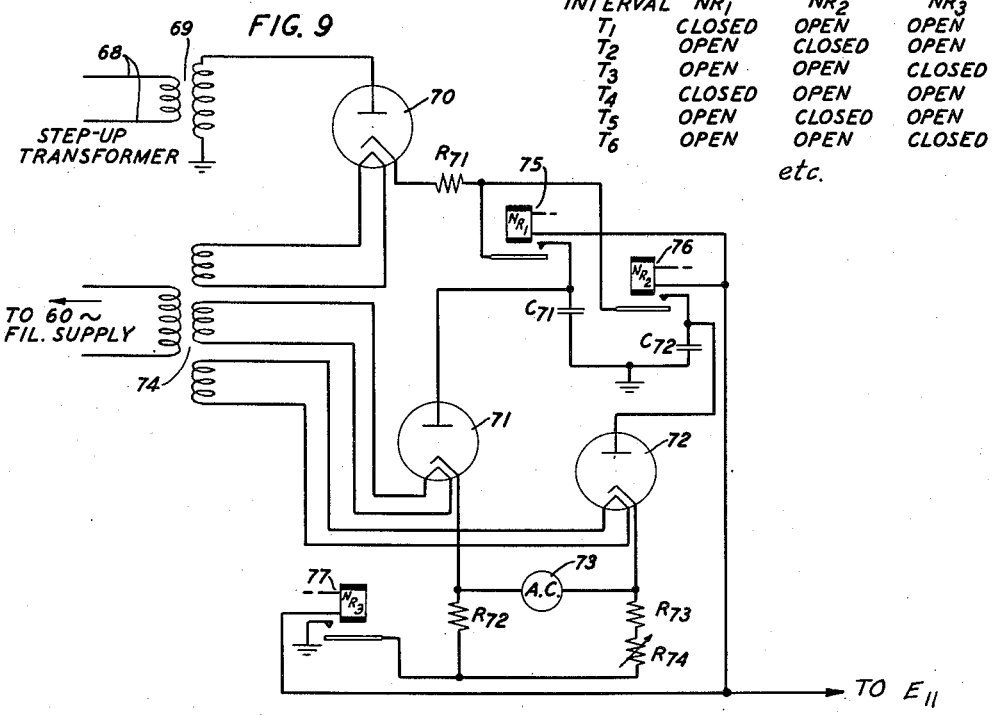
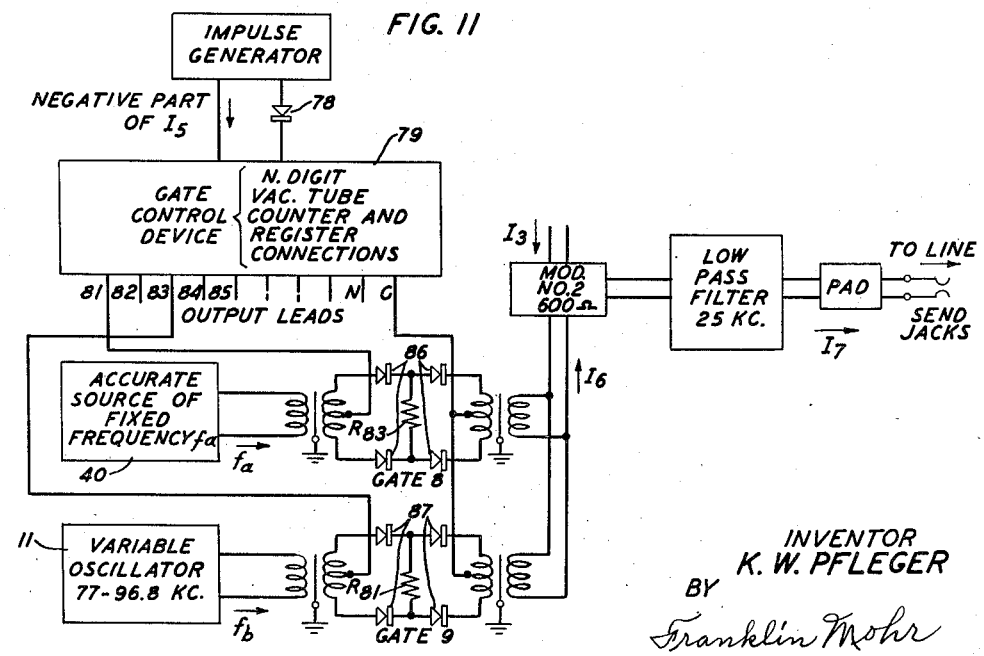
INVENTOR
K. W. PFLEGER
BY
Franklin Mohr
ATTORNEY

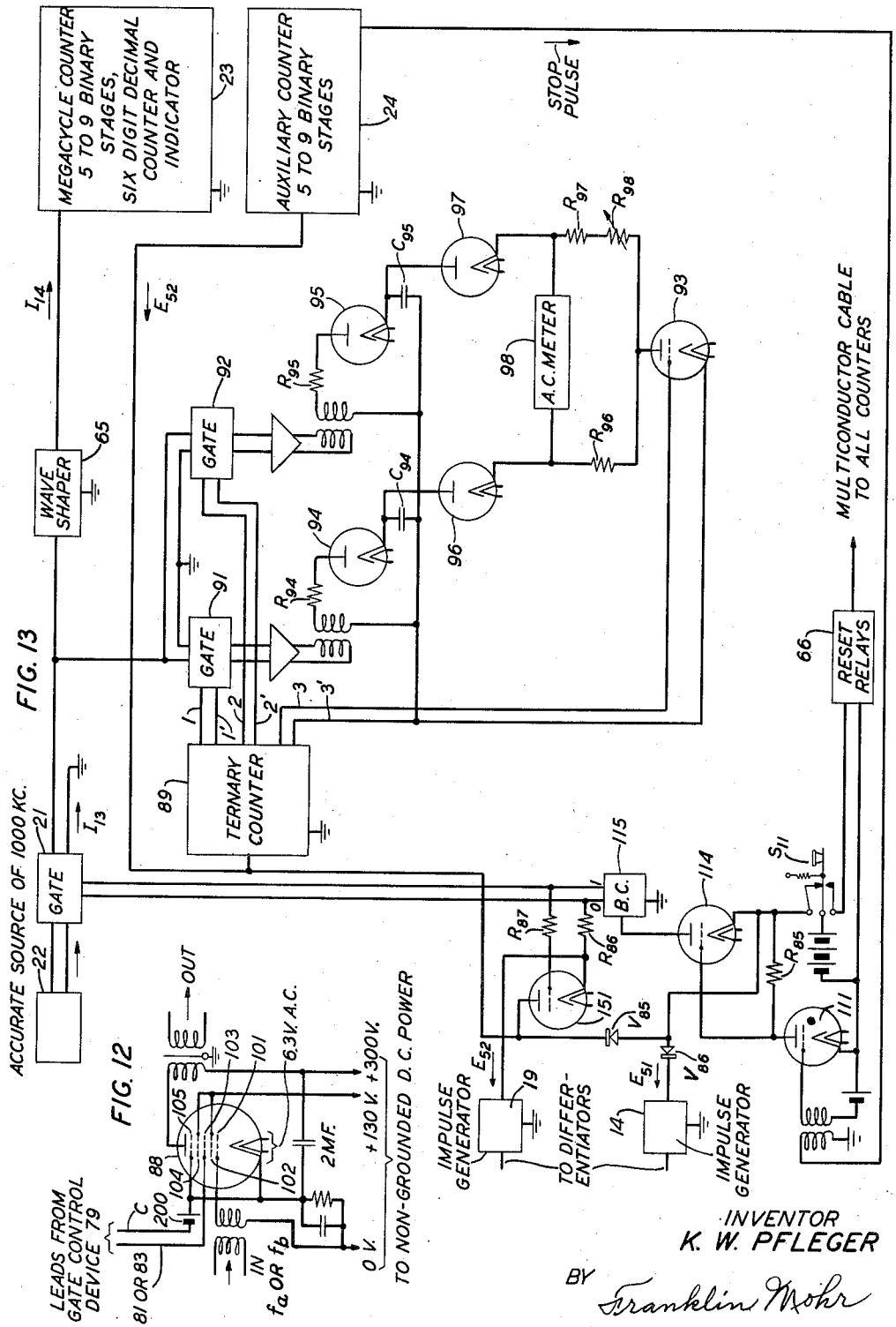

United States Patent Office 2,829,342
Patented Apr. 1, 1958

2,829,342

TIME MEASURING SYSTEM

Kenneth W. Pfleger, Arlington, N. J., assignor to Bell Telephone Laboratories, Incorporated, New York, N. Y., a corporation of New York Original application April 25, 1951, Serial No. 222,832, now Patent No. 2,700,133, dated January 18, 1955. Divided and this application November 10, 1954, Serial No. 468,075

5 Claims. (Cl. 324—68)

This invention relates to time measuring systems with particular emphasis upon improving the accuracy of such a system in the presence of noise currents which tend to interfere with the application of electrical counting methods to the measurement of time intervals.

An object of the invention is to sum up electrical counts during a succession of recurrent substantially equal time intervals to obtain an average value for a single such interval.

A feature of the invention is a control system for counting the individual time intervals as well as the total number of cycles of a standard wave source occurring during the intervals and for automatically stopping both counts when a desired number of intervals have occurred.

Another feature is a noise indicator useful in determining how many intervals should be counted in order that the average time per interval may be determined with a desired degree of accuracy.

This application is a division of copending application Serial No. 222,832, filed April 25, 1951, now United States Patent No. 2,700,133, issued January 18, 1955.

In the figures:

Fig. 1 is a single-line schematic diagram of an illustrative system embodying the invention;

Fig. 2 is a single-line schematic diagram of an illustrative sending device;

Figure 4:
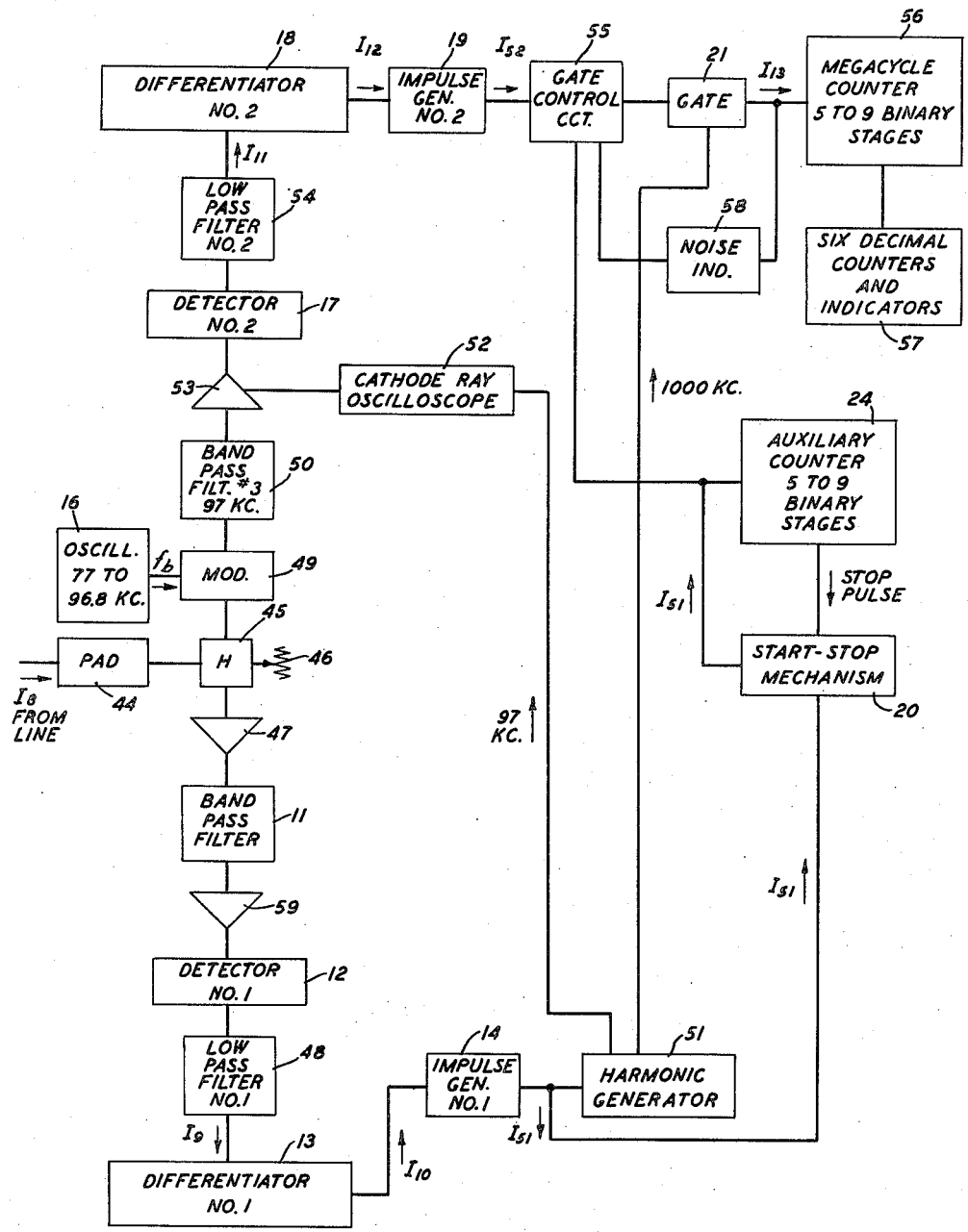
Fig. 4 is a single-line schematic diagram of an illustrative receiving device.
Figure 5:
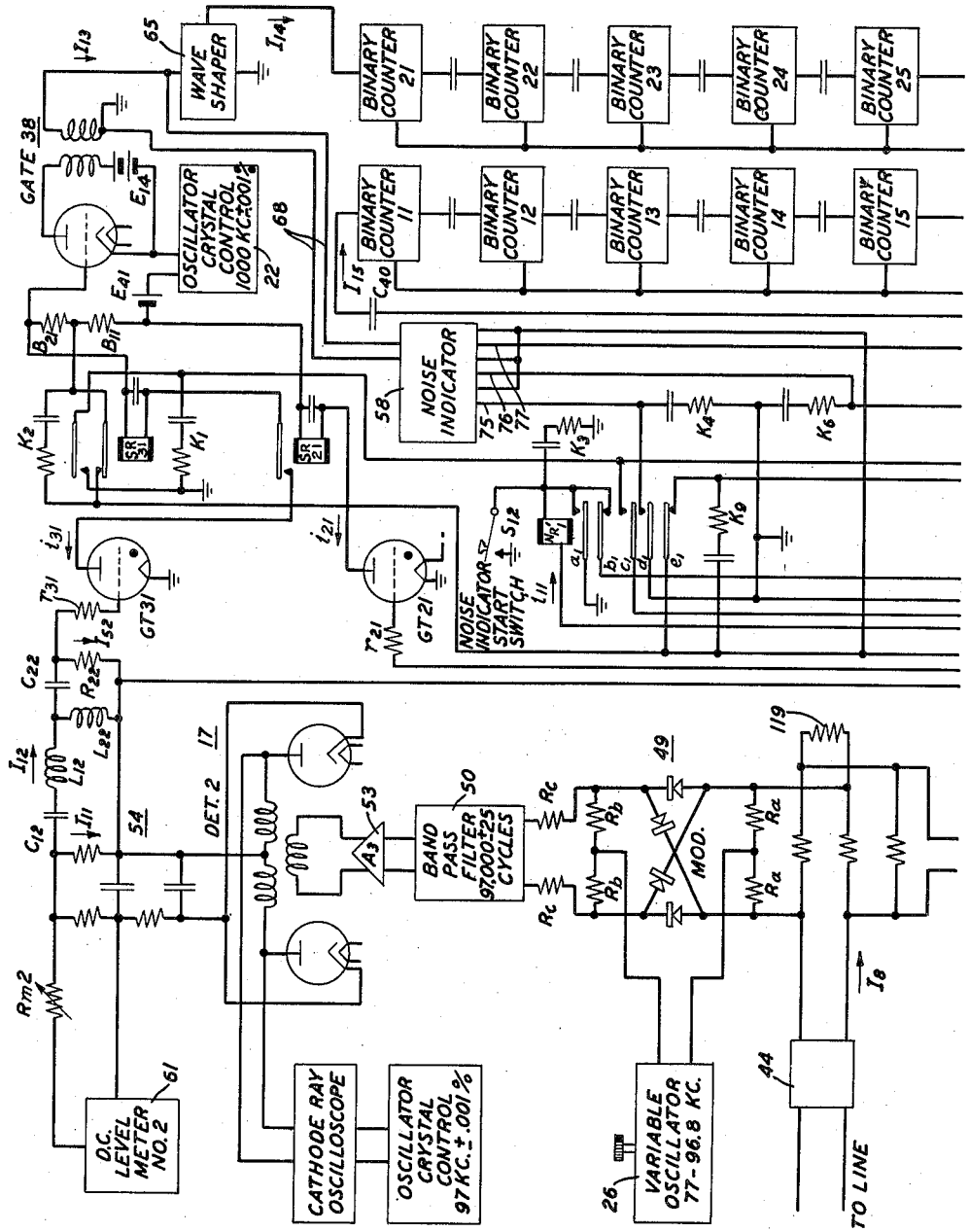
Figure 6:
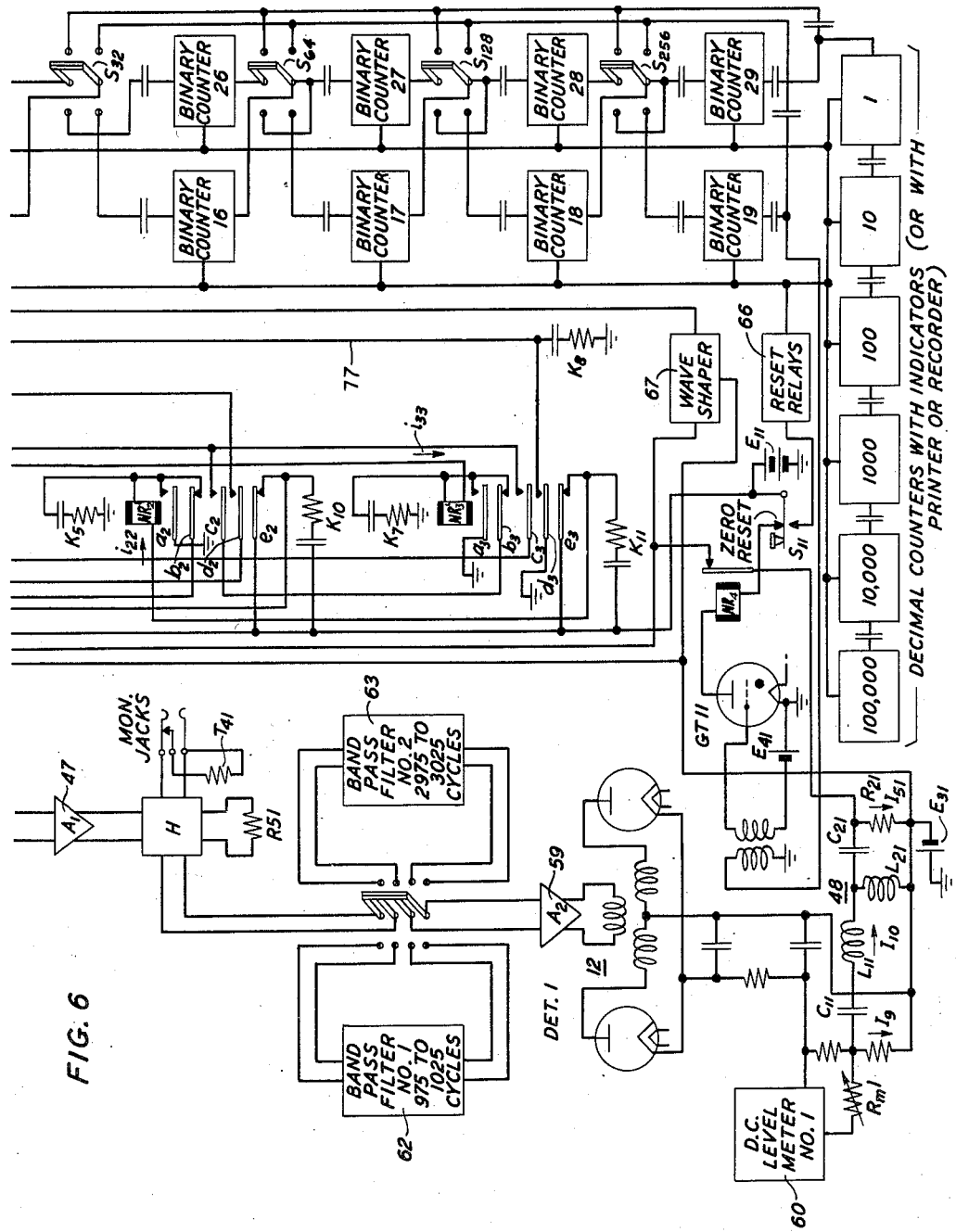
Figure 7:
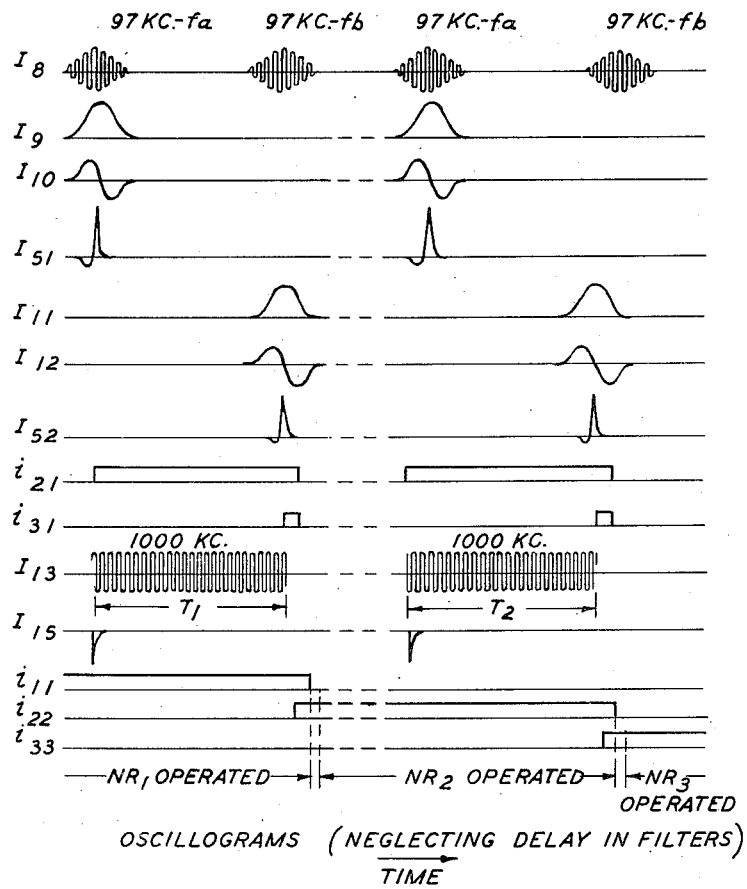
Figure 8:
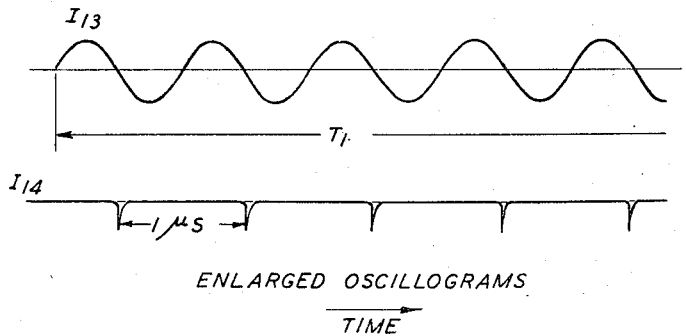

Figs. 5 and 6 taken together provide a double-line schematic diagram of an illustrative receiver in greater detail than shown in Fig. 4;

Fig. 7 is a group of illustrative oscillograms of currents in various circuit branches of the systems of Figs. 4, 5, and 6;

Fig. 8 is a group of enlarged oscillograms of currents in certain circuit branches in the systems of Figs. 4, 5, and 6;

Fig. 9 is a schematic diagram of a noise indicator;

Fig. 10 is a tabulation of a sequence of relay operations involved in the operation of the noise indicator of Fig. 9;

Fig. 11 is a schematic diagram of an alternative gating system for use at a sending terminal;

Fig. 12 is a schematic diagram of a gate control circuit employing a pentagrid vacuum tube; and Fig. 13 is a schematic diagram of a portion of an alternative receiving arrangement.

General method and apparatus

In the disclosed system involving the present invention, there is employed a method of measuring envelope delay distortion as applied over a straightaway circuit or line, which comprises (a) sending periodically onto the line to be measured a pulse of reference frequency tone and a pulse of comparison or measuring frequency tone, one after the other, preferably with restricted sidebands, (b) counting the time elapsing between arrivals of particular amplitudes of these pulses' envelopes at the receiving end, and (c) averaging the results of a multiplicity of such counts when it is desired to reduce fortuitous effects such as caused by noise. The averaged count may be automatically indicated; and successive indications, each taken with a different measuring frequency and using the same time interval between sent tones, give substantially the envelope delay distortion vs. frequency characteristic except for a constant delay which is usually unimportant. If the absolute delay is desired, it can be obtained when measuring is done on a loop rather than on a straightaway basis.

Usually the narrower the range to which sidebands of the measuring (variable) frequency signal are restricted the better, as the delay measured is then more nearly the same as the theoretical value $d\beta/d\omega$, except that the received envelope wave is then so gradual in slope that it is very difficult to measure time accurately to a particular point on the wave. As a compromise in a telephoto circuit, e. g., it is practical to receive a signal spectrum about 50 cycles wide from the line having sidebands each 25 cycles wide. The sent wave's envelope is rounded, closely approximating the function $$c(1+\cos 50\pi t)$$

where $c$ is a constant and $t$ has values from $-.02$ second to $+.02$ second. Outside this range of $t$ the envelope is zero until time for the next mark. This gives rise to a wide band of frequencies but the energy outside the 50 cycle band is small. Due to the cut-off of the receiving band bandpass filter, the received envelope departs somewhat from that of the sent wave.

The sidebands of the reference frequency signal need not be restricted to such a narrow band as 50 cycles, because it is not necessary that its delay approximate $d\beta/d\omega$. Any delay value is satisfactory for the reference pulse so long as it is constant. However, the greater the restriction of bandwidth, the easier it becomes to use measuring frequencies close to the reference frequency without erroneous operation of selective receiving circuits due to overlapping of frequency spectra of these tones. By using wide sidebands for the reference tone and by giving it a steep wave front the need for much amplification of the reference wave at the receiving end diminishes, as discussed below. Of course, the frequency spectrum of the reference tone should not contain much energy in the frequency range used for the measuring tone, and consequently it is then difficult to measure delay distortion very close to the reference frequency. The use of two reference frequencies is then generally necessary in order to obtain a complete delay distortion characteristic over all parts of the desired frequency range. Although the illustrative examples disclosed hereinafter do not use wide sidebands, this possibility is available in case one wishes to trade cost and weight of apparatus for the slight inconvenience of using two reference frequencies.

In the event that a 50 cycle bandwidth is used for both reference and measuring frequency marks, one may use measuring frequencies as close as about 100 cycles to any reference frequency. Furthermore, by using two different reference frequencies successively it is possible to obtain the delay distortion anywhere in the pass band of the line, when the delay distortion characteristic obtained with one reference frequency is modified by a suitable constant so that one continuous characteristic results when both are plotted on the same graph.

In the counting mechanism, to measure the time interval between the arrivals of particular amplitudes of the reference and measuring tones, measuring preferably is done between peak values of the detected envelope waves of these tones because small amounts of level variation or selective attenuation on the line do not appreciably affect the mechanism's ability to discern the instants of maximum current. These instants are easily recognizable after passing the detected envelopes over a differentiating circuit because the latter's output wave passes through zero at each maximum of the received wave, and the rapid change in sign of the differentiator's output is suitable for the precise operation of trigger circuits for starting or stopping an electronic counter.

In order to insure still more reliable operation of trigger circuits the transitions in the differentiator's output wave may be greatly amplified, as is accomplished partly by nonlinear coils which generate a sharp impulse of high voltage, and partly by linear amplification.

Separate amplifiers and differentiators may be used for the two detected signals, although some saving in cost may result from a reduction in such apparatus, such as by the use of wider sidebands for the reference frequency signal as explained above.

Although an electronic counter measures delay precisely in one observation, the value may be influenced by interfering effects such as caused by noise. Therefore it is generally advantageous to design the counter so that it makes a number of delay measurements and indicates the average value.

Outline of illustrative system

Fig. 1 is a simplified schematic diagram of an illustrative system having the basic elements required in the practice of the invention. Sinusoidally-enveloped pulses of a suitable high frequency carrier are produced at accurately timed intervals at the sending end of the transducer 1 to be measured, such as a line by means of a pulse repetition frequency source 2 of frequency such as 25 cycles reacting with a carrier oscillator 3, of frequency such as 97,000 cycles, in a first modulator 4. The resulting modulated wave is impressed upon a second modulator 5 along with selected and timed pulses of standard and variable comparison frequency oscillations of uniform duration from oscillators 6 and 7 respectively. The pulses of standard frequency are under the control of a first gate 8 and those of the variable frequency under the control of a second gate 9, both gates being operated by a gate control device 10 which in turn is under the control of the low frequency source 2. The device 10, upon being manually started by the operator, first opens gate 8 to pass one pulse of standard frequency, then closes gate 8 for a selected number of pulse intervals, generally only one pulse interval, as in the illustrative system, then opens gate 9 and passes one pulse of comparison frequency, closes gate 9 and holds both gates closed for a selected number (one or more) of pulse intervals and repeats this series of operations until shut down. The modulator 5 shifts the standard and variable comparison pulses downward in frequency to the desired values of frequency with which the transducer 1 is to be tested, for example, the standard pulses may be shifted to 3000 cycles and the variable frequency pulses to the range 200 to 20,000 cycles, a low pass filter 34 being inserted between the modulator 5 and the transducer 1. At the receiving end of the line a band filter 11 selects the 3000 cycle pulse which is thereupon translated into a sharp impulse by means of a detector 12, a differentiator 13 and an impulse generator 14. To handle the pulses of variable frequency efficiently it is usually preferable to shift them to a common frequency band as by means of a frequency shifter 15 controlled by a variable frequency oscillator 16. The common frequency may advantageously be placed at 97,000 cycles in the illustrative example. The 97,000 cycle resulting pulse is translated into a sharp impulse by means of a detector 17, a differentiator 18 and an impulse generator 19. The first impulse upon the generator 14 is used to actuate a start-stop mechanism 20 which in turn actuates a gate device 21 which connects a standard counting cycle generator 22 to a cycle counter 23 which counts cycles from the generator 22 as long as the gate 21 remains open. The next impulse, which comes from generator 19, shuts off the counting cycle generator, and, registers a count of one on a sample counter 24. When the last sample has been received and its number of cycles counted, the sample counter 24 stops the counting process by actuating the start-stop mechanism 20 to close the gate 21. The total count is shown on the count indicator 25, and is an automatically averaged value of all sample counts, as explained more fully hereinafter.

Sending apparatus

Figure 3:
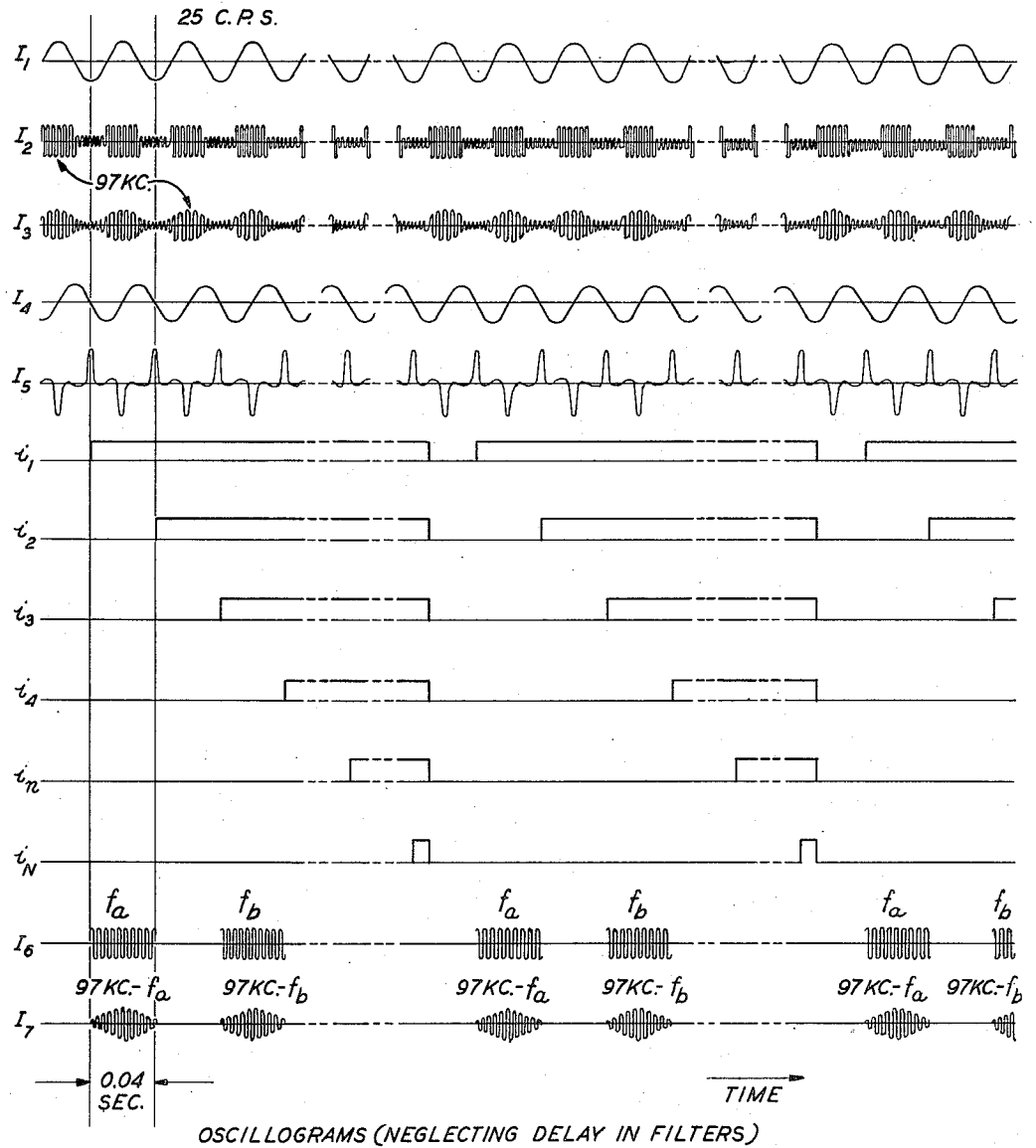
Fig. 3 is a group of illustrative oscillograms of currents in various circuit branches of the system of Fig. 2.

The purpose of the sender is to transmit to the sending end of the line under test successive modulated spurts of reference and variable comparison frequency separated by fixed time intervals of zero current as shown by the oscillogram of current $I_7$ in Fig. 3. The reference frequency as illustrated is (97 kc.$-f_a$) where $f_a$ may have any convenient number of fixed values, and the variable frequency is (97 kc.$-f_b$) in the example shown. These two voice frequencies are the result of heterodyning in the example hereinafter described. The envelope wave of these spurts is substantially sinusoidal as explained below, and resembles a 25 cycle wave in the system. The duration of each spurt is .04 second when the modulating wave is 25 cycles. The time elapsing between the peak value of the reference tone and the peak value of the next following spurt of variable frequency tone is assumed to be fixed, at .08 second. Therefore there is zero output during .04 second of this interval. This interval may be made greater if desired depending upon whether the envelope delay in the line is appreciably greater at the reference frequency than at any variable frequency used, it being necessary that these pulses shall not overlap at the receiving end of the line.

The choice of the time elapsing between the peak value of the variable frequency tone and the peak of the next succeeding reference frequency spurt depends upon the amount of delay distortion to be measured, since it is necessary that the spurt of variable frequency tone shall not overlap or run into the spurt of reference frequency tone at the receiving end of the line. It is evident that the duration of the zero current interval following a pulse of variable frequency at the sender output should about equal the maximum value of delay distortion to be measured.

Illustrative spurts or pulses are shown in Fig. 3 as current $I_7$ and in order to obtain current $I_7$, the sending device may be shown schematically by the single-line diagram in the upper portion of Fig. 2.

In Fig. 2, a source 26 of accurate frequency provides the input wave of a multivibrator or frequency divider 27 whose output is the first modulating frequency, for example, 25 cycles per second in the case of certain telephotograph circuits.

The 25 cycle wave passes over a hybrid coil 30 and one output thereof is connected to one input of the first modulator 4. The other input of this modulator is an accurate high frequency, for example 97 kilocycles obtained either as a harmonic of the accurate source 26 through the connection 29 as shown (or from the frequency divider 27). The value 97 kilocycles is assumed for illustrative purposes. A narrow bandpass filter 31 is shown at the output of the first modulator 4. The sidebands passed by this filter are narrow so that the current $I_3$ at its output has only three frequencies: 96.975, 97.0, and 97.025 kilocycles. The amplitudes of 25 cycles per second and 97 kilocycles applied to modulator 4 preferably are adjusted so that $I_3$ is 100 percent modulated as shown in the oscillogram of Fig. 3. If the control source 26 is a 50 cycle per second tuning fork the connection 29 may be used, 97 kilocycles being the 1940th harmonic of 50 cycles per second. This may require several stages of harmonic generation. If the control frequency is one kilocycle, only the 97th harmonic is required.

The harmonic generator 28 may provide also any desired number of accurate high frequencies near 97 kilocycles such as values shown in Fig. 2 at two other outputs of the generator, and discussed more fully below. The particular high frequency desired may be selected by means of a switch $S_4$ and is the frequency referred to hereinabove as $f_a$. A rectangular spurt of frequency $f_a$ is passed by the first gate 8 starting and ending when the envelope of $I_3$ has zero value as shown in the oscillograms of $I_6$. A rectangular spurt of .04 second duration of frequency $f_b$ from the variable high frequency oscillator 7 is passed by the second gate 9, .04 second later than the spurt of $f_a$ as shown in the oscillogram of $I_6$. The gates 8, 9 and the gate control 10 are described more fully below, and are synchronized by a current of 25 cycles from the other output of the hybrid coil 30. A balancing network 32 for the hybrid coil 30 is indicated schematically, and a pad 33 is shown connected between a low pass filter 34 and the line to be tested.

The currents $I_3$ and $I_6$ enter the second modulator 5 and the lower sideband in the output is selected by the low pass filter 34, the current $I_7$ being obtained. When current $I_6$ has long continued zero value $I_7$ also is zero because the current $I_3$ does not appreciably pass over the modulator 5, which is preferably balanced for this purpose, and the low pass filter 34 cuts off well below 96.975 kilocycles.

Receiving apparatus

In order to carry out the function of the receiving device as stated above, the apparatus shown by the single-line schematic of Fig. 4 may be provided.

The current $I_8$ shown in the oscillograms of Fig. 7, received from the line closely resembles $I_7$ of Fig. 3, except for such difference between arrival of spurts of reference frequency (97 kilocycles—$f_a$) and variable frequency (97 kilocycles—$f_b$) as is caused by envelope delay distortion of the line.

The current $I_8$ after traversing a pad 44 divides at a hybrid coil 45 with balancing network 46 into two paths. The reference frequency passes through a buffer amplifier 47 and the bandpass filter 11 and enters detector 12 (DET. 1) through a buffer amplifier 59. The carrier frequency is eliminated by a low pass filter 48 (L. P. F. 1). The resulting direct-current wave $I_9$ is shown in the oscillograms in Fig. 7 as a rounded "E" signal. It is not quite sinusoidal due to bandwidth limitation in the receiving narrow bandpass filter 11. Both reference and variable frequency spurts from the upper output of hybrid coil 45 enter a signal shifter comprising a modulator 49 (MOD), a variable oscillator 16 and a 97 kilocycle bandpass filter 50 (B. P. F. 3). The variable oscillator is set to give the frequency $f_b$ so that pulses of frequency (97 kilocycles—$f_b$) on entering the modulator 49 are shifted to 97 kilocycles and pass through B. P. F. 3. The 97 kilocycle output of a harmonic generator 51 further mentioned below and a cathode ray oscilloscope 52 (C. R. O.) are useful in checking the frequency of the shifter's output. Pulses of frequency (97 kilocycles—$f_a$) are shifted by the modulator 49 but then lie outside the pass band of B. P. F. 3. The output of this bandpass filter is next amplified in amplifier 53 and detected in detector 17 (DET. 2). The carrier frequency is eliminated by a low pass filter 54 (L. P. F. 2) and the current $I_{11}$ is obtained similar to $I_9$ except for a delay.

Both $I_9$ and $I_{11}$ are next differentiated in differentiators 13 and 18 respectively, to yield waves $I_{10}$ and $I_{12}$. These waves pass through zero at instants corresponding to maxima of $I_9$ and $I_{11}$ respectively.

The waves $I_{10}$ and $I_{12}$ act upon impulse generators 14 and 19 respectively, which preferably employ nonlinear coils to produce the impulses $I_{51}$ and $I_{52}$, respectively, having sharp positive peaks building up at a fast rate so that prompt and definite action of the connected circuits results. These circuits comprise a gate control circuit 55, the gate 21, a megacycle counter 56 having a plurality of binary stages, and a set of decimal counters 57 with indicators.

Once a start button ($S_{11}$ to be described hereinafter with reference to Figs. 5 and 6) has been pressed which automatically resets all counters on zero, the positive pulses of $I_{51}$ open the gate 21 and the positive pulses of $I_{52}$ close the gate. A megacycle current $I_{13}$, produced by the harmonic generator 51 activated by periodically repeated pulses of $I_{51}$, flows through the gate 21 during an interval of time T equal to the interval between the occurrence of a positive pulse in $I_{51}$ and the next succeeding positive pulse in $I_{52}$.

Each time a pair of these pulses occurs a spurt of megacycle current of duration T enters the binary megacycle counter 56. This counter and the connected decimal counter 57 operate as described below to indicate the average value of T in microseconds on a digital register, which may be luminous and may show six digits, more or less, as desired, or may be arranged through known printing mechanisms to record figures, or upon a paper tape.

Sample counter 24 sends a negative pulse into the start and stop mechanism 20 which stops all counting when sufficient repetitions of the interval T have been measured and averaged, as described below.

In prior art systems employing a dynamometer, the operator of the delay measuring set can tell when excessive noise is present by unsteadiness of the dynamometer reading as explained. In the case of random noise he must watch the dynamometer deflection a while and estimate an average reading. In the case of single frequency noise he can change the variable carrier frequency slightly and eliminate the effect. In the set herein described, the presence of noise may vary the location of peak values of $I_9$ and $I_{11}$ which tends to make unequal the successive intervals of megacycle current such as T. This inequality can be detected by a noise indicator 58 which operates under control of the gate control circuit 55 as described below. The meter of the noise indicator may be calibrated to indicate the number of repetitions of the interval T which ought to be averaged in the case of random noise. Then the operator can see how to set switches in the binary counters which govern the number of repetitions of the measurement of T as described hereinafter. The presence of single frequency noise usually causes the noise indicator meter to deflect. Its effect should be eliminated by varying the carrier frequency until the noise does not pass the narrow band receiving filter as discussed more fully below.

In Figs. 5 and 6, the harmonic generator of Fig. 4 is replaced by separate precise oscillators which need not be used in practice if the harmonic generator is cheaper, lighter or otherwise preferable.

The pad 44 is provided for coarse adjustment of received current, since it is desirable to maintain fairly constant levels into the modulator 49 and the amplifier 47. Pad 44 also provides a suitable terminating impedance for the transducer under test. Very constant levels should be maintained in the two detectors as by means of slide-wire potentiometers (not shown) located within power amplifiers 59 and 53, and a pair of sensitive and sluggish direct-current level meters 60 and 61 may be held by these manual controls to constant deflections in order to reduce phase variations caused by nonlinearity in the detectors 12 and 17. The former detects the reference frequency tone while the latter detects the variable frequency tone after it is shifted in frequency to 97 kilocycles by the variable frequency oscillator and modulator in the previously discussed manner. The detected pulses $I_9$ and $I_{11}$ are also shown qualitatively in the sketch of oscillograms on Fig. 7 and resemble the modulating wave form described above except for slight distortion due to line and filters which is unimportant because it is practically unchanged over the range of testing frequencies.

The narrow bandpass filter 50 of approximately 50 cycle width is used in the signal shifter to reduce the line noise and other disturbances if present.

The bandpass filters 62 and 63 for two reference frequencies are also of about 50 cycle width when the sent pulses of reference frequency are thus restricted in frequency spectrum as this favors measuring fairly close to the reference frequency without appreciable error.

The low pass filters 43 and 54 immediately following the respective detectors 12 and 17 consist of series resistors and shunt condensers because inductances at high levels are apt to be nonlinear and to cause varying effects as the level changes slightly. These filters suppress the carriers. No wave shaping is required of these filters due to the wave shaping action of the sending bandpass filters.

Currents $I_{10}$ and $I_{12}$ are substantially proportional to the slopes of currents $I_9$ and $I_{11}$, respectively, due to the differentiating effect of series condensers $C_{11}$ and $C_{12}$, which respectively perform the functions of the differentiators 13 and 18 of Fig. 4.

Coils $L_{21}$ and $L_{22}$ are nonlinear and operate to produce sharp wave fronts in currents $I_{51}$ and $I_{52}$ so that the voltages across resistors $R_{21}$ and $R_{22}$ rise from 0 to 8 volts in about two microseconds. The optimum values for circuit elements connecting to these nonlinear coils may be found by trial.

Inductances $L_{11}$ and $L_{12}$ help to suppress the carriers and prevent discharge of condensers $C_{21}$ and $C_{22}$ toward the source. These inductances should be substantially linear. Each may consist of one or more retard coils. The inductance of such coils should be determined experimentally to obtain the desired maximum amplitudes for $I_{10}$ and $I_{12}$ with a minimum of input power and without excessive transients. Initial fluctuations during the build up of $I_{10}$ or $I_{12}$ are not wanted as they may cause unwanted pulses in $I_{51}$ and $I_{52}$ ahead of the desired times which might give false operation of gas tubes.

A zero reset switch $S_{11}$ is provided and when this has been closed momentarily, gas tube G. T. 11 is not firing and a neutral relay $NR_4$ is released so that a pulse of $I_{51}$ is transmitted over the contact of $NR_4$ and resistor $r_{21}$ to the grid of gas tube G. T. 21 which fires to open the vacuum tube gate 38.

The next succeeding pulse in $I_{52}$ is transmitted over resistor $r_{31}$ to the grid of gas tube G. T. 31 which fires to close the gate. Accordingly the megacycle current $I_{13}$ which passes the gate has the duration $T_1$. This is equal to the time interval elapsing between the sharp rises of the respective pulses in $I_{51}$ and $I_{52}$ provided currents $i_{21}$ and $i_{31}$ rise abruptly with equal slopes to full value when the respective gas tubes fire.

A relay $SR_{31}$ is necessary in series with the plate of gas tube G. T. 31 which operates to cut off its plate voltage from source $E_{11}$ and extinguishes both gas tubes very soon after gate closure.

A relay $SR_{21}$, having substantially identical winding impedance to that of $SR_{31}$, is provided in the plate circuit of gas tube G. T. 21 so that both plate circuits have substantially identical transient responses. The windings of $SR_{21}$ and $SR_{31}$ may be shunted by small condensers so as to obtain the nearest approach to rectangular on and off switching of the gate. The contacts of relay $SR_{21}$ are open at the firing instant of gas tube G. T. 21 to make sure that tube G. T. 21 fires before tube G. T. 31, but close shortly thereafter to permit firing of gas tube G. T. 31 on the next pulse of $I_{52}$.

The megacycle pulses in $I_{13}$ are shown again to an enlarged scale in Fig. 8. They may be passed through a wave shaper 65 to produce negative pulses of the same fundamental periodicity, as shown in the oscillogram of $I_{14}$. Such pulses are suitable for operating binary counters B. C. 21, B. C. 22, et cetera. In some cases, the shaper 65 is not needed, the binary counter operating satisfactorily without the shaper. The shaper may be made of either tube circuits or varistor circuits, or a copper oxide varistor with a direct-current bias may be used to pass short pulses of only one polarity.

The counting mechanism, described below keeps adding up the number of megacycle pulses it receives not only during time interval $T_1$ but also during $T_2$ and succeeding time intervals measured until a predetermined number of such intervals have passed whereupon a pulse is received by the grid of a gas tube G. T. 11 from an auxiliary series of binary counters, B. C. 11, B. C. 12, et cetera, which count the number of positive spikes in $I_{51}$. This pulse fires the gas tube G. T. 11 and its plate current operates the relay $NR_4$ to stop further spikes in $I_{51}$ from acting on the counters, at which time the counter indication becomes stationary and may be read and recorded by the operator. Operation of $NR_4$ should not occur until at least .04 $(N-1)$ second has elapsed following the final spike in $I_{51}$, and must be complete before .04N second has elapsed, in order to allow the gate to remain open for the longest necessary value of T and to make sure it does not open after the last value of T. N is the number of reference frequency spurt intervals between the envelope peaks of successive reference frequency spurts. Therefore, relay $NR_4$ should be slow acting and its slowness should be adjustable if N is varied.

The restoring of all counter circuits to the zero condition is accomplished by pressing the reset key $S_{11}$ which operates reset relays 66 to make suitable voltage changes in the power supply of the counter stages, as discussed below.

The circuits of relays $NR_1^1$, $NR_2^1$, and $NR_3^1$ are provided for the purpose of driving a noise indicator as described below. This indicator detects variations in lengths of successive spurts of the current $I_{13}$. When these variations are excessive, the number of samples of the time intervals $T_1$, $T_2$, $T_3$, et cetera, averaged by the megacycle counter should be increased as described more fully below.

The number of sample averaged is controlled by a set of switches $S_{32}$, $S_{64}$, $S_{128}$, and $S_{256}$. When all these switches are closed to the left, 512 samples are averaged. When one of these switches is closed to the right and the others are closed to the left, the number of samples averaged is the same as the subscript on the designation of the switch which is closed to the right.

The time which is required for the counter to average a given number of samples is about equal to that number multiplied by .04N second.

A wave shaper 67 is also shown for inverting pulses $I_{51}$ to produce the current pulses $I_{15}$ used to drive the auxiliary counter. Pulses in $I_{51}$ when inverted may be suitable for driving this counter. Therefore, the wave shaper 67 may be nothing but an inverter, for the purpose of changing positive pulses into negative pulses similar to $I_{14}$.

In case the sent reference tone is given wider sidebands, bandpass filters 62 and 63 should be just wide enough to pass them. A tenfold increase in these sidebands permits the received reference signal to build up about ten times as fast and changes the shape of $I_9$ from sinusoidal to nearly rectangular. The differentiated current $I_{10}$ then consists of positive and negative spikes. By making use of one or the other of these spikes to fire G. T. 21 and to operate the auxiliary counter, one can omit $L_{11}$, $L_{21}$ and condenser $C_{21}$ and probably decrease the size of amplifier 59 and detector 12. The values for $R_{21}$ and for the low pass filter 48 would be changed, the resistors being much smaller as they need not dissipate as much heat.

Electronic counters, trigger circuits, gates, et cetera, have been used for other purposes. Consequently no detailed explanation of these elements is considered necessary. Electronic counters are described by C. B. Leslie, "Megacycle Stepping Counter," Proceedings Institute Radio Engineers, volume 36, No. 8, August 1948, pages 1030 to 1034.

Counting mechanism

It is assumed in the system illustrated that during a time interval T ranging in duration from about 40,000 to 40,000 ($N-1$) microseconds, a precisely one megacycle current flows from the oscillator 22, Fig. 1, suitable for operating an electronic pulse counter. The time interval and the one megacycle current flow are repeated periodically, each such interval being separated by a short time of zero current. Due to small amounts of line noise not under control, slight fortuitous variations exist in the value T from one repetition to the next. In order to reduce the effect of these, and to obtain a better value of T, it is desirable to add and average a number of separate measurements of T. In accordance with the invention, apparatus is provided to automatically indicate the result in microseconds.

Let $2^n$ denote the approximate number of repetitions of repetitions of T which should be averaged in order to reduce the fortuitous effects to a negligible amount, the value for $n$ being calculable for any small amount of noise as explained below. The megacycle pulses of $I_{14}$ in Figs. 5 and 6 are made to operate first on a binary electronic counter comprising $n$ pairs of (or $n$ double) tubes. The output of the binary counter is connected to a six stage decimal counter. The latter counter registers a digit about once in each $2^n$ microseconds. The final reading of the decimal counter is the desired average value of T.

Averaging of a plurality of measurements of T is effected automatically by adjustment of a scale factor associated with the counting mechanism. An average being by definition the sum of $m$ readings divided by $m$ and the sum is equal to $m$ times the average. For example, if the sum of eight readings is 1,600,000, the average is 200,000. Hence, if the counter counts once for every eight cycles of the megacycle current, the result of impressing 1,600,000 cycles upon the counter is an indicated count of 200,000 which gives the average directly expressed. Also, if there are a total of 6,400,000 cycles impressed upon the counter in the course of 32 readings, average reading again 200,000, the counter may be arranged to count once for every 32 cycles, giving an indicated count of 200,000, thus once more directly indicating the average. By using such a scheme, the average value as indicated is independent of the number of samples averaged.

It is evident that when $n=5$ there are 32 samples of T averaged and since samples of T occur every .2 second when $N=5$ the running time is 6.4 seconds. It has been determined by computation that in the case of a telephotograph line on which there is a normal or average amount of random noise here assumed to be like thermal noise, the measuring error represented by the average of 32 values of T has a standard deviation of 8.2 microseconds, which should usually be satisfactory precision in measuring telephotograph circuits. Such a normal or average amount of thermal noise is sometimes referred to as a thermal noise level of 35 dba with telephoto weighting at the zero level point of a telephotograph line. The unit used in expressing the noise level is adjusted decibels, abbreviated dba, and refers to the reading of a noise measuring set such as the Western Electric Company's No. 2 type noise measuring set described in Bell Laboratories Record, March 1936, volume 14, page 233, when used with an appropriate equalizer designed to weight the disturbing effect of noise currents of different frequencies and durations upon a telephotograph circuit, the noise measurement being made at the zero level point of the line.

Experience with telephotograph operation has indicated that the highest tolerable limit of thermal noise is reached at 45 dba or 10 decibels above the normal or average condition. When the noise is at the highest tolerable limit, the number of values of T which must be averaged to obtain the same standard deviation of error is ten times as great, or 320. In the binary scale the lowest sufficient value of $n$ is 9, requiring the averaging of 512 values of T, since with $n$ equal to 8, only 256 values of T would be averaged. Accordingly the binary counter needs to have 9 double tubes or stages such as B. C. 21 to B. C. 29 in Figs. 5 and 6, so that $n$ may be varied by desired amounts between 5 and 9, using switches $S_{32}$, $S_{64}$, $S_{128}$, and $S_{256}$ as described above.

Noise indicator

Noise on the line may reduce the accuracy of the timing of an interval by distorting, lengthening, or shortening of the pulses of $I_8$ of Fig. 7, which in turn affects the shape of the detected pulses $I_9$ and $I_{11}$, and displaces the zero points of $I_{10}$ and $I_{12}$, and hence affects the spacing between the impulses $I_{51}$ and $I_{52}$. The net result is that either too many or too few cycles of the standard frequency are included in the intervals $T_1$, $T_2$, et cetera, of $I_{13}$. The accuracy in the presence of line noise may be improved by including a large number of intervals in the cycle count. The more the effect of line noise, the more intervals should be included. As the effect of line noise is random, it is very likely to make itself evident by making adjacent intervals unequal. The more noise, the more inequality is likely to be found.

Although one may compute the number of values of T which should be averaged when the line noise has a certain value, it is advantageous to have a meter which indicates this automatically.

In Fig. 5 it is shown that the output of the vacuum tube gate 38 is tapped by a branch circuit delivering megacycle power to the noise indicator 58 shown simply by a box in this figure but shown more in detail in Fig. 9. Therein leads 68 and a step-up transformer 69 impress a high megacycle voltage upon a rectifier 70 which may charge either condenser $C_{71}$ or $C_{72}$ over a high resistance $R_{71}$. Therefore the charge on either condenser is proportional substantially to the charging time which is the same as the duration of a spurt of megacycle current such as $T_1$ or $T_2$, et cetera.

As shown by the table of Fig. 10, a neutral relay $NR_1$ has closed contacts during time interval $T_1$, corresponding to the spurt of megacycle current $T_1$ in the oscillogram of Fig. 7. The condenser $C_{71}$ is charged during this time $T_1$. The contacts of two other relays $NR_2$ and $NR_3$ are then open as shown in the table. Shortly thereafter the contacts of $NR_1$ open and this is followed by closure of contacts of relay $NR_2$ so that during time interval $T_2$ the condenser $C_{72}$ is charged. After the end of interval $T_2$ the contacts of $NR_2$ open. Shortly after this the contacts of relay $NR_3$ close which permits both condensers to discharge simultaneously to ground through a pair of rectifiers 71 and 72 and resistors $R_{72}$, $R_{73}$, and $R_{74}$. The resistance $R_{74}$ is adjusted so that the alternating-current meter reads zero when the two condenser discharges are equal as when noise is absent. Then subsequent inequality of duration of two adjacent spurts of megacycle current will cause unequal charges upon condensers $C_{71}$ and $C_{72}$, and during discharge will produce meter torque about in proportion to the difference between the duration of $T_1$ and $T_2$. The meter should be sluggish as of the thermocouple type and may be calibrated in terms of the exponent $n$ required to satisfactorily average out the effect of the noise. (It would also be possible to operate switches $S_{32}$, $S_{64}$, $S_{128}$, and $S_{256}$ automatically from the meter with the help of marginal relays, not shown.) Condenser discharge cannot occur until relay $NR_3$ closes contacts because neither tube 71 nor 72 will conduct current from filament to plate. The tubes 70, 71, 72 are served by a filament supply transformer 74.

In order to insure closing or opening of contacts of relays $NR_1$, $NR_2$, and $NR_3$ to completely include all of the respective time intervals indicated in Fig. 10, various means can be used to activate the relay windings. One method is next described which uses three auxiliary neutral relays $NR_1^1$, $NR_2^1$, and $NR_3^1$ shown in Figs. 5 and 6.

Before the power supply $E_{11}$ in Figs. 5 and 6 is turned on, relays $NR_1^1$, $NR_2^1$, and $NR_3^1$ are not operated and all their moving tongues are in the down position. After $E_{11}$ is functioning, the operator starts the noise indicator by momentarily closing a start switch $S_{12}$ which permits current to flow from $E_{11}$ over tongue $e_2$ of relay $NR_2^1$ through the winding of relay $NR_1^1$ to switch $S_{12}$ and there to ground. This relay then operates and current continues to flow in its winding to ground by way of tongue $a_1$ after the start switch is no longer closed.

The operator may next press the zero reset switch $S_{11}$ and the counting mechanism starts. During the entire first pulse of megacycle current in the interval $T_1$ current $i_{11}$ flows through relay $NR_1^1$ as shown in the oscillograms, and consequently relay $NR_1$ is also operated due to closure of contact by tongue $d_1$ of relay $NR_1^1$ and a connection 75 indicated in Figs. 5, 6, and 9.

Shortly after the interval $T_1$, relay $SR_{31}$ operates to ground its upper tongue momentarily whereupon current $i_{22}$ flows from source $E_{11}$ over tongue $e_3$ of relay $NR_3^1$ through the winding of relay $NR_2^1$, tongue $b_2$, tongue $c_1$, upper tongue of relay $SR_{31}$ and to ground. Accordingly relay $NR_2^1$ operates and remains operated after release of $SR_{31}$ because of current $i_{22}$ now flowing over tongue $a_2$ to ground. During operation of relay $NR_2^1$, tongue $a_2$ makes contact before tongue $b_2$ breaks contact. The make before break feature can be obtained by suitable mechanical design. Operation of $NR_2^1$ opens the contact of tongue $e_2$ so that relay $NR_1^1$ releases and $i_{11}$ falls to zero as shown in the oscillograms of Fig. 7.

At about the same time as relay $NR_1^1$ releases, relay $NR_1$ releases as relays $NR_1$, $NR_2$, and $NR_3$ are all made fast release relays. However they are made slightly slow to operate so that closure of contact does not occur until after the previously operated relay in this group has released. Slow operation may be attained when necessary by inserting a separate inductance (not shown) in series with the winding of each relay to be slowed.

Operation of relay $NR_2^1$ permits current to flow over relay $NR_2$ to ground by way of tongue $d_2$, and a connection 76 shown in Figs. 5, 6, and 9 and shortly thereafter relay $NR_2$ operates. The timing is such that it operates after $NR_1$ has released and before the start of time interval $T_2$.

Shortly after time interval $T_2$ another brief closure of the upper contact on relay $SR_{31}$ occurs. This time current $i_{33}$ flows from source $E_{11}$ over tongue $e_1$, winding of $NR_3^1$, tongue $b_3$, tongue $c_2$, to upper tongue of relay $SR_{31}$, and thence to ground.

Immediately relay $NR_3^1$ operates and continues to remain operated due to current $i_{33}$ flowing over tongue $a_3$ after release of $SR_{31}$. (Tongue $a_3$ makes contact just before tongue $b_3$ opens contact.)

Operation of relay $NR_3^1$ stops current $i_{22}$ due to opening of the contact of tongue $e_3$. Due to operation of tongue $d_3$ and current through a connection 77 the operation of relay $NR_3$ takes place shortly after $NR_2$ releases caused by opening of contact by tongue $d_2$.

The next closure of relay $SR_{31}$ permits the rise of $i_{11}$ again by way of tongue $e_2$, winding of $NR_1^1$, tongue $b_1$, tongue $c_3$, and upper contact of $SR_{31}$. After $SR_{31}$ releases, $i_{11}$ continues by way of tongue $a_1$ and $i_{33}$ is stopped by opening of contact $e_1$. (Tongue $a_1$ makes contact just before tongue $b_1$ breaks contact.) This concludes one complete cycle of events in the noise indicator auxiliary relays, and again places condenser $C_{71}$ in condition for charging just as soon as relay $NR_1$ operates due to closure of tongue $d_1$.

Spark killers $K_1$, $K_2$, $K_3$ . . . $K_{11}$ are shown to reduce relay contact erosion. Condensers and resistances should be adequate to quench the sparks but should not slow down the current decay too much.

Alternative gating systems for sending terminal

An electric counting circuit shown in Fig. 11 and comprising a plurality of vacuum tubes and varistors may be used in place of the gas tubes and relays to reduce weight and cost of maintaining relay contacts. The oscillograms in Fig. 3 apply to Fig. 11 as regards currents shown in the latter, except for the insertion of a one-way device 78 so that only the negative pulses of current $I_5$ are received by the gate control device of Fig. 11.

An N-digit counter 79 of any suitable known kind may be used. The operation of the counter is such that during the first period of .04 second corresponding to a desired rectangular spurt of fixed high frequency $f_a$ in the current $I_6$, the potential on output lead 81 of the counter 79 is positive with respect to that on lead C. This causes gate 8 to open because direct-current passes over its varistors in the forward direction. At other times the potential of lead 81 is less than that of lead C and gate 8 is closed. During the third period of .04 second corresponding to a desired rectangular spurt of variable high frequency $f_b$, gate 9 is similarly operated, but at other times it is closed. Gate 8 may contain a plurality of varistors 86 and a resistor $R_{83}$ and gate 9 may contain a plurality of varistors 87 and a resistor $R_{81}$ as shown.

Values for resistors $R_{81}$ and $R_{83}$ are to be chosen by trial to obtain a high ratio between amplitude of gate output when open as compared to the closed condition, 35 decibels or more usually being satisfactory. When necessary to obtain a higher ratio, a multiplicity of such gates may be used in tandem, controlled by the same gate control output leads.

Switches may be provided by means of which one can open leads 81 and 83 and insert positive direct potential upon either gate for the purpose of obtaining a continuous current of either frequency $f_a$ or $f_b$. This is useful when adjusting the sending levels.

Some care will have to be used in order not to render the counting mechanism inoperative due to the gate varistors having too low an impedance in the forward direction. If trouble is experienced in this respect one may use a pentagrid gate so that the control lead goes to a high impedance grid, as shown in Fig. 12.

Fig. 12 shows the alternative form of gate using a pentagrid tube 88. Lead 81 or 83, as the case may be, from the counter 79 is connected to grid 103 of tube 88 and lead C is connected to grid 105. The input from either source 40 or oscillator 11 is connected through a transformer to the grid 101 and the output is taken from the anode. Grids 102 and 104 are connected together and function as screens between grids 101 and 103, and 103 and 105, respectively. An 18-volt biasing battery 200 shown in series with lead C keeps the gate closed during times when lead 81 or 83 has no positive potential. This biasing battery could also be in series with lead 81 or 83 instead of lead C, or could be partly in each lead so long as it is poled to make grid 103 more negative than grid 105.

Alternative receiving arrangement

Fig. 13 shows a portion of a receiver similar to the arrangement of Figs. 5 and 6 except that all relays but those in the reset device are eliminated. The latter relays could also be eliminated if one would put their contact leads instead on a multiple contact switch including contacts of $S_{11}$. From the line to the differentiators the system is the same as that of Figs. 5 and 6. Also, the megacycle counter and indicator 23 in Fig. 13 is the same as the binary counters 21 through 29 and the decimal counters with indicators in Figs. 5 and 6. The auxiliary binary counter 24 in Fig. 13 is the same as the auxiliary binary counters 11 through 19 in Figs. 5 and 6. The impulse generators 14 and 19 are the same in both figures except that in Fig. 13 negative pulses instead of positive pulses appear at their outputs, due to a reversal in the leads at their inputs, since negative pulses are required for operation of certain known types of binary counter. Counters 24, 89, and 115 are shown as of such type, while counter 23 is shown as operatable on positive pulses, or when $I_{14}$ consists of negative current as in Fig. 8, counter 23 operates on negative pulses.

The desired negative voltage pulses $E_{51}$ and $E_{52}$ have shapes similar to the current pulses $I_{51}$ and $I_{52}$ shown in oscillograms in Fig. 7 except for the change in sign.

Vacuum tubes 114 and 151 shown do not have continuous plate supply sources but are operable momentarily by negative pulses of suitable strength as in $E_{51}$ or $E_{52}$, under the further control of their respective grids, so that either tube is disabled when its grid is sufficiently negative with respect to its cathode.

When the power is first turned on, gas tube G. T. 111 will not be firing, but it fires when a sufficient number of pulses of $E_{52}$ have acted on the auxiliary counter to produce a stop pulse at its output which acts on the grid of G. T. 111 through the associated input transformer. Counters 23 and 115 stop when G. T. 111 fires as explained below.

Before a delay measurement is made, one must press key $S_{11}$ to operate the reset device which places all counters in the zero condition in the manner hereinabove described. It is necessary that all counters shall be reset to the zero condition before pulses of $E_{51}$ or $E_{52}$ are allowed to reach them. Therefore, key $S_{11}$ is designed to make contact to the fast acting reset relays before plate current of tube G. T. 111 is cut off by the key, in order that all counters shall reach the zero condition before the plate current is cut off, which has the effect of removing negative grid bias from vacuum tube 114 and opening this vacuum tube gate to permit the next negative pulse of $E_{51}$ to act on counter 115.

In case a pulse of $E_{52}$ occurs ahead of said pulse in $E_{51}$ and after opening of vacuum tube gate 114, that pulse of $E_{52}$ can have no effect on B. C. 115 because with B. C. 115 on zero the potential of its output lead 1 is less than that of its output lead 0 which biases the grid of vacuum tube 151 negatively by about 22.5 volts and prevents plate current from flowing therein due to the pulses of $E_{52}$. Thus, it is evident that no pulse of $E_{52}$ is received by any counter until the first pulse of $E_{51}$ has acted on B. C. 115 to operate this counter to the 1 condition so that lead 1 at its output is about 22.5 volts more positive than lead 0 which opens the gate consisting of V. T. 151. Resistors $R_{86}$ and $R_{87}$ may be provided if necessary to limit current flowing from leads 0 and 1 so that changes in potential on these leads shall not affect the performance of counter 115 through feedback action.

Gate 21 may be of either of the types shown in Figs. 11 and 12, and opens promptly when B. C. 115 is in the 1 condition, to permit megacycle current $I_{13}$ to flow into the wave shaper 65 when the first pulse of $E_{51}$ occurs after operation of the start button $S_{11}$.

The next pulse of $E_{52}$ may pass through the anode-cathode circuit of V. T. 151 because the negative grid bias has been removed.

As soon as the negative pulse $E_{52}$ reaches counter 115, the counter operates to close gate 21 and terminates the duration of the spurt of megacycle current. Succeeding pulses of $E_{51}$ and $E_{52}$ also respectively start and stop the megacycle current $I_{13}$ in the same manner. The result is the same as in Figs. 5 and 6 in that the starting and stopping of the megacycle current occur respectively as the impulses in $E_{51}$ and $E_{52}$ build up.

The purpose of varistor $V_{85}$ is to prevent pulses of $E_{51}$ from operating the auxiliary counter 24 or the ternary counter 89 described below in connection with the noise indicator. Varistor $V_{86}$ is provided to cut off the output impedance of impulse generator No. 1 during a pulse of $E_{52}$ so that the full effect of the pulse acts on the counters.

In order to insure uniform action, the wave fronts of $E_{51}$ and $E_{52}$ should be steep and the counter 115 should be made fast acting the same as the first stage of the megacycle counter 23 hereinabove described.

When the desired number of repetitions of the megacycle spurt has been obtained, the auxiliary counter has received a corresponding number of pulses of $E_{52}$ and its last stage then sends out a pulse which fires gas tube G. T. 111 as in the case of Figs. 5 and 6. In Fig. 13 the firing of G. T. 111 causes a voltage drop across resistor $R_{85}$ which biases negatively the grid of vacuum tube 114 and prevents further operation of counters 115 and 23 inclusive due to succeeding pulses until after the operator has again pressed key $S_{11}$.

Whenever a pulse of $E_{52}$ passes through vacuum tube 151 to operate binary counter 115 from the 1 to the 0 condition, the same pulse operates the auxiliary counter 24 with a signal similar to $I_{15}$ of Fig. 7 except that it occurs at the end of the time intervals $T_1$, $T_2$, et cetera. Also, the same pulse operates a second auxiliary counter shown in Fig. 13 as ternary counter 89 for use in controlling gates 91, 92, and 93 of the noise indicator. These gates replace relays respectively designated as $NR_1$, $NR_2$, and $NR_3$ in Fig. 9.

The gates 91, 92, and 93 are opened one at a time in the order mentioned for the duration of .04N second after the respective pulse of $E_{52}$. N has the same meaning as in the previous description.

When gate 91 has opened, the megacycle current flowing through gate 21 after the next pulse of $E_{51}$, can also flow over gate 91, amplifier $A_4$, and diode rectifier 94 to charge mica condenser $C_{94}$ through a high resistance $R_{94}$ so that the final charge on $C_{94}$ when gate 91 closes on the next pulse of $E_{52}$, is proportional to the duration of the megacycle spurt, for example, $T_1$, in Fig. 7.

As soon as the ternary counter 89 closes gate 91, it opens gate 92, and during the next spurt of megacycle current, mica condenser $C_{95}$ is charged in a similar manner to $C_{94}$, until its final charge is proportional to $T_2$.

As soon as gate 92 has closed, the ternary counter 89 opens gate 93 so that both condensers $C_{94}$ and $C_{95}$ discharge simultaneously over one-way valves 96 and 97, respectively, and over resistors $R_{96}$, $R_{97}$, $R_{98}$ and the alternating-current meter 98. As described hereinabove the discharge circuit is balanced so that there is no meter indication when times $T_1$ and $T_2$ are equal. Since this noise indicator circuit will vary somewhat from time to time due to temperature changes in the condensers and resistances, et cetera, it should occasionally be readjusted for balance. Since it is not always possible to obtain a perfectly quiet line for use between the sender and receiver when making such adjustment, an inexpensive low frequency local oscillator should be provided in the receiver to provide signals with no fluctuation noise.

The plate supply for gas tube 111 as well as its grid bias battery (if used), are non-grounded in order not to interfere with the operation of the counters, all of which operate on a separate single plate supply which is assumed to have its negative terminal grounded.

As in the case of the meter 73 in Fig. 9, the meter 98 may be calibrated preferably in terms of the exponent $n$ which determines the number of samples which should be counted to reduce to a desired degree the probable error of the measured delay time. It is to be understood that the above-described arrangements are illustrative of the application of the principles of the invention. Numerous other arrangements may be devised by those skilled in the art without departing from the spirit and scope of the invention.

While in the sample-counting stages and in the preliminary standard wave cycle stages, binary counters are shown and are desirable in order that the number of samples may be readily variable in powers of two, it is nevertheless feasible to use ternary counters or counters based upon other numbers. Also, wherever decimal counters are shown, counters using systems of numeration with other bases may be used instead. Where the number of events to be counted is fixed, as in the noise measuring circuit of Fig. 13, there may be but one advantageous choice of the base of the system of numeration, for which reason the use of the ternary counter 89 may be preferred for controlling the three essential steps in the noise measuring operation.

What is claimed is:

1. In a time measuring system, a source of standard waves, means coupled to said source for passing successive trains of waves from said source and suppressing such waves during the interval between said trains, a source of pulses, means for applying pulses from said pulse source to actuate said wave train passing means to pass a train of waves from said source of standard waves, means coupled to said wave train passing means for counting cycles of waves from said source of standard waves passed by said wave train passing means, means connected to said pulse source for counting pulses therefrom, and means connected to said pulse counting means and to said wave train passing means for stopping the counting of both the standard wave cycles and said pulses when the number of said pulses reaches a desired value.

2. A time interval measuring system for recurrent intervals comprising means for producing recurrent starting signals and stopping signals which mark the beginning and end respectively, of the said recurrent time intervals, a source of standard waves, means for counting a desired number of starting signals, a first counting means for counting cycles of standard waves from said source actuated by each said starting signal and operating until deactivated by the next succeeding stopping signal, a second counting means actuated by said first counting means in a fixed ratio whereby said second counting means registers a count of one for each $n$ cycles of standard waves, means for adjusting the value of $n$ and the desired number of starting signals in a desired relationship, means to stop the counting of starting signals and of cycles of standard waves when the desired number of starting signals is reached, and means to indicate the total counts registered by said second counting means as a measure of time.

3. A time measuring system for recurrent time intervals comprising a source of recurrent starting signals alternating with stopping signals which mark the beginning and end, respectively, of the said recurrent time intervals, a source of standard wave cycles, a first counter connected to said source of starting and stopping signals and selectively sensitive to said starting signals, said counter providing an output pulse upon receipt of a fixed number M, of impressed starting signals, a second counter connected to said source of standard wave cycles under the control of said source of starting and stopping signals, said second counter providing an output pulse upon receipt of the same number M, of standard wave cycles, a third counter connected to the output of said second counter, to count the output pulses delivered by said second counter, means to stop all of said counters after M of said recurrent time intervals have been completed, and means for indicating the total number of pulses received by said third counter.

4. A time measuring system for recurrent time intervals comprising a source of recurrent starting signals and stopping signals which mark the beginning and end, respectively, of the said recurrent time intervals, a source of standard wave cycles, a first binary counter of $n$ stages connected to said source of starting signals for counting $2^n$ starting signals, a second binary counter of the same number of stages connected to said source of standard wave cycles and controlled by said starting and stopping signals for counting standard wave cycles during the successive recurrent time intervals, a decimal counter operatively connected to said second binary counter for receiving therefrom one pulse for each $2^n$ standard wave cycles, means for stopping all of said counters when $2^n$ intervals have been completed, and means for indicating the total number of pulses registered by said decimal counter.

5. In a time interval measuring system for recurrent intervals with reference to signaling transmission over a given line, means for supplying from said line a pulse which is composed of a group of waves of a given frequency and has a rounded envelope, said pulse corresponding to a predetermined time of each of said recurrent intervals, envelope detecting means connected to said supplying means, differentiating means connected to said envelope detecting means for producing an output which changes in sign in response to the occurrence of a maximum amplitude in said envelope, and means connected to said differentiating means for producing a sharp impulse in response to said change in sign.

References Cited in the file of this patent
UNITED STATES PATENTS

| | | |
|---|---|---|
| 2,414,107 | Kenyon | Jan. 14, 1947 |
| 2,632,810 | Nyman | Mar. 24, 1953 |
| 2,700,133 | Pfleger | Jan. 18, 1955 |